United States Patent
Schneider

(10) Patent No.: US 10,526,128 B2
(45) Date of Patent: Jan. 7, 2020

(54) CONTAINER COMPRISING TREATMENT MEANS AND METHOD FOR THE PRODUCTION OF SAME

(71) Applicant: Sanner GmbH, Bensheim (DE)

(72) Inventor: Matthias Schneider, Heidesheim (DE)

(73) Assignee: SANNER GMBH, Bensheim (DE)

(*) Notice: Subject to any disclaimer, the term of this patent is extended or adjusted under 35 U.S.C. 154(b) by 160 days.

(21) Appl. No.: 15/545,616

(22) PCT Filed: Jan. 21, 2016

(86) PCT No.: PCT/EP2016/051210
§ 371 (c)(1),
(2) Date: Jul. 21, 2017

(87) PCT Pub. No.: WO2016/116551
PCT Pub. Date: Jul. 28, 2016

(65) Prior Publication Data
US 2018/0016081 A1 Jan. 18, 2018

(30) Foreign Application Priority Data
Jan. 22, 2015 (DE) .................. 10 2015 100 947

(51) Int. Cl.
*B65D 81/26* (2006.01)
*B29C 45/44* (2006.01)
(Continued)

(52) U.S. Cl.
CPC ........ *B65D 81/266* (2013.01); *B29C 45/0017* (2013.01); *B29C 45/44* (2013.01);
(Continued)

(58) Field of Classification Search
CPC .... B65D 81/266; B29C 45/44; B29C 45/4407
See application file for complete search history.

(56) References Cited

U.S. PATENT DOCUMENTS

| 3,135,566 A | 6/1964 | Frank | |
| 4,635,808 A * | 1/1987 | Nolan | B29C 45/44 |
| | | | 215/252 |

(Continued)

FOREIGN PATENT DOCUMENTS

| DE | 2116742 A | 11/1972 |
| DE | 689 26 902 T2 | 12/1996 |

(Continued)

OTHER PUBLICATIONS

English language translation of the International Preliminary Report on Patentability including the Written Opinion of the International Searching Authority for International Patent Application No. PCT/EP2016/051210 dated Aug. 3, 2017; 9 pages.

(Continued)

*Primary Examiner* — Andrew T Kirsch
(74) *Attorney, Agent, or Firm* — Dean W. Amburn; Giroux Amburn PC

(57) ABSTRACT

A container is provided having a container body (2), which forms a receiving space (3) for goods to be packaged. The container body (2) has a side wall (4) and a container base (5) connected integrally to the side wall (2), The container body (2) also has an opening (6), wherein the container body (2) has a chamber (13), which is filled with a solid treatment substance (14). The chamber (13) is provided with a cover (15), which prevents the solid treatment substance (14) from leaving the chamber (13) and is moisture-permeable and/or gas-permeable. The container is characterized in that the container body (2) has a synthetic material injection-moulded part, which forms the container base (5) and the side wall (4). The invention also relates to a method for producing such a container.

15 Claims, 7 Drawing Sheets

(51) Int. Cl.
*B29C 45/00* (2006.01)
*B65D 1/24* (2006.01)
*B65D 43/16* (2006.01)
*B29K 101/12* (2006.01)
*B29L 31/00* (2006.01)

(52) U.S. Cl.
CPC ............ *B65D 1/24* (2013.01); *B65D 43/162* (2013.01); *B29K 2101/12* (2013.01); *B29L 2031/712* (2013.01)

(56) References Cited

U.S. PATENT DOCUMENTS

| | | | |
|---|---|---|---|
| 5,153,038 | A | 10/1992 | Koyama et al. |
| 5,788,064 | A * | 8/1998 | Sacherer ............ A61B 10/0096 206/204 |
| 6,571,942 | B2 | 6/2003 | Riemenschneider et al. |
| 2013/0213828 | A1 | 8/2013 | Chatterjee et al. |

FOREIGN PATENT DOCUMENTS

| | | |
|---|---|---|
| JP | 2002 274575 A | 9/2002 |
| JP | 2002 274576 A | 9/2002 |
| JP | 2002 284249 A | 10/2002 |
| JP | 2004 161323 A | 6/2004 |
| JP | 2005 263227 A | 9/2005 |
| WO | WO 2012 049546 A1 | 4/2012 |

OTHER PUBLICATIONS

International Search Report [translated] for Application No. PCT/EP2016/051210 dated Feb. 24, 2016; 2 pages.
International Search Report [foreign] for Application No. PCT/EP2016/051210 dated Feb. 24, 2016; 5 pages.
Written Opinion [foreign] for Application No. PCT/EP2016/051210 dated Feb. 24, 2016; 9 pages.
German Search Report for patent application No. 10 2015 100 947.1 dated May 5, 2015; 7 pages.
Machine-Assisted English language translation of the specification and claims for German Application No. DE 2116742 A extracted from www.espacenet.com on Jul. 15, 2017, abstract not found; 6 pages.
Machine-Assisted English language translation of Japanese Publication No. JP 2002-274575 A extracted from www.espacenet.com on Jul. 15, 2017; 11 pages.
Machine-Assisted English language translation of Japanese Publication No. JP 2002-274576 A extracted from www.espacenet.com on Jul. 15, 2017; 11 pages.
Machine-Assisted English language translation of Japanese Publication No. JP 2002-284249 A extracted from www.espacenet.com on Jul. 15, 2017; 6 pages.
Machine-Assisted English language translation of Japanese Publication No. JP 2004-161323 A extracted from www.espacenet.com on Jul. 15, 2017; 8 pages.
Machine-Assisted English language translation of Japanese Publication No. JP 2005-263227 A extracted from www.espacenet.com on Jul. 15, 2017; 7 pages.

* cited by examiner

CONTAINER COMPRISING TREATMENT MEANS AND METHOD FOR THE PRODUCTION OF SAME

CROSS-REFERENCE TO RELATED APPLICATIONS

This application is the National Stage of International Patent Application No. PCT/EP2016/051210, filed Jan. 21, 2016, which claims priority to and all the advantages of German Patent Application No. 10 2015 100 947.1, filed Jan. 22, 2015, the entire contents of which are hereby incorporated by reference.

TECHNICAL FIELD

The invention generally relates to a packaging container with a solid treatment substance. The invention also relates to a method for producing such a container.

BACKGROUND

Containers which have a container body with a receiving space and a chamber provided with a cover are known. Drying agents are routinely provided as treatment agents in such chambers. In this way, goods to be packaged and arranged in the receiving space can also be kept dry in a reliable manner over lengthy time periods.

U.S. Pat. No. 3,135,566 describes a tubular container for storing coins. The container has a container body with a side wall, which is formed integrally with the container base. Arranged in the lower region of the container body is a chamber for a drying agent. Provided on the inner side of the side wall is an annular socle, on which a cover is arranged. The cover is held on the socle by a ring consisting of rubber material. The previously known container is complex and expensive to produce.

Japanese Patent No. JP 2002-284249 A describes a further container. It has a receiving space and a chamber for drying agent. The container body has two openings. A socle is provided on the inner side of the side wall. On the part of the chamber, a container base, which is formed by a separately produced lid, is provided. In order to fill the chamber, the container is initially turned over and the cover of the chamber is placed on the socle. The chamber is then filled with drying agent and closed with the lid. This container is also complex and expensive to produce.

U.S. Patent Application Publication No. 2013/0213828 A1 describes a further container having a receiving space and a chamber for drying agent. The container body has a rib profile, into which a cover for the chamber is snap-fitted. This previously known container body is not formed as an injection-moulded part. Again, the container body is complex and expensive to produce.

SUMMARY

An object of the invention is to provide a container having a receiving space and a chamber for a treatment agent, such as in particular a drying agent, which can be produced in a cost-effective manner and can also be handled easily. An object of the invention is also to provide a method for producing such a container.

Accordingly, in the case of a container as described, provision is made that the container body has a synthetic material injection-moulded part, which forms the container base and the side wall, which is integrally connected to the container base, and that arranged on an inner side of the side wall is a latching means, behind which the cover is latched. Such a container can be produced cost-effectively and with a high level of quality. Since the container base is produced integrally with the side wall in an injection-moulding process, it is not necessary to produce and assemble a separately produced container base. Due to the latching means, which is arranged on the side wall, the cover can be inserted and latched-in easily and quickly. During production of the injection-moulded part, the container base and side wall can be produced from the same material in the same injection-moulding operation. In particular, the solid treatment substance can be a drying agent, e.g. silica gel. However, other treatment substances, which have a solid consistency, such as e.g. aromatic substances, active substances or humectants, can also be provided. The cover prevents the solid treatment substance from coming out of the chamber and entering the receiving space. A moisture-permeable cover allows moisture to pass from the receiving space to the drying agent and be bonded there. A gas-permeable cover renders it possible for aromatic substances or active substances, which are emitted by a treatment substance, to pass from the chamber into the receiving space. The container can be formed in particular as a packaging container. It is particularly suitable for moisture-sensitive goods to be packaged and can be formed in particular as a container for pharmaceutical products, such as medicaments. Furthermore, the container is particularly suitable for packaging chemical substances and substances for analysis, such as e.g. test strips.

In an advantageous non-limiting embodiment of the invention, provision is made that the latching means has a protrusion, which is arranged on the inner side of the side wall. The protrusion can form an undercut, which enables the cover to be latched in. The protrusion can be formed e.g. in an annularly circumferential manner. A plurality of protrusions, e.g. in the form of elevations or nubs, can also be provided.

In an advantageous manner, the latching means, in particular the protrusion, protrudes with respect to the inner side of the side wall by a value between 0.1 mm and 1.0 mm. It is particularly preferred, if the latching means protrudes with respect to the inner side of the side wall by a value between 0.15 mm and 0.5 mm. On the one hand, this configuration allows the container to be produced in a simple and cost-effective manner by an injection-moulding process. In this configuration, the container body can be demoulded in particular by forced demoulding. This configuration also allows the cover to be securely fixed and easily latched-in during insertion.

Furthermore, in accordance with the invention, provision can advantageously be made that the latching means has, on its side facing towards the opening, a first sliding surface, which is inclined with respect to a longitudinal axis of the container body and along which the cover slides during insertion with the cover being deformed, before said cover latches in behind the latching means. This makes it easier to insert the cover and fix it in a reliable manner. The first sliding surface is inclined preferably at an inclination angle of less than 20°, particularly preferably less than 15°, with respect to the longitudinal axis of the container body. It is also preferred if the inclination angle is greater than 10°.

In one advantageous non-limiting embodiment, provision is made that the latching means has, on its side facing away from the opening, a second sliding surface, which is inclined with respect to the longitudinal axis of the container body. In particular, this configuration facilitates the production. Preferably, the second sliding surface is inclined at an inclination angle of less than 45°, particularly preferably less than 35°, with respect to the longitudinal axis of the container body. It is also preferred if the inclination angle is greater than 20°.

In accordance with the invention, it is further preferred that the cover is arranged on a side of the latching means facing towards the chamber. In this manner, the latching means can hold the cover in position.

A further improvement is achieved when the cover lies against the side wall in a region of the side wall adjacent to the latching means. This prevents, inter alia, the treatment substance from coming out of the chamber.

In accordance with the invention, it is further preferred that the maximum volume of the chamber, which is determined by the position of the latching means and the position of the cover resulting therefrom, is slightly greater than the volume of the treatment substance received therein. In particular, this simplifies production as the cover can then be latched-in more easily. It is preferred, that the volume of the chamber is 1% to 10% greater than the volume of the treatment agent received in the chamber.

In a further advantageous non-limiting embodiment of the invention, provision is made that, on the side of the cover facing towards the chamber, the side wall does not have a protrusion for fixing the cover. In this case, the cover lies on the treatment substance and is prevented from moving in a disadvantageous manner by means of said substance.

The assembly is facilitated by virtue of the fact that the cover is elastically deformable such that, during insertion of the cover, the cover can be moved past the latching means. Moreover, this elasticity provides assistance in ensuring that the cover does not move unintentionally after insertion.

In accordance with the invention, it is also advantageous, if the latching means has a circumferential protrusion, which is arranged on the inner side of the side wall. In particular, the protrusion can be formed in an annular manner. Furthermore, the latching means can also comprise a plurality of separate elevations which can be formed e.g. as nubs.

In order to adjust the level of moisture in the receiving space, the treatment substance can comprise a drying agent. Silica gel and molecular sieve are particularly suitable as drying agents.

Furthermore, in accordance with the invention it has been proved to be successful if the container body is formed in a cylindrical manner.

The cover can be formed preferably as a disk. In a particularly preferred manner, the disk does not have a groove at its circumferential edge.

The cover can have preferably an open-pored material. In particular, cardboard, a non-woven material (e.g. Tyvek), a mesh structure, a perforated synthetic material disk and/or a woven fabric can be used.

Furthermore, in accordance with the invention, it is preferred, that the cover is arranged onto the treatment substance.

Preferably, the cover is held between the latching means and treatment substance. The latching means thereby prevents the cover from moving in a first direction towards the opening. The treatment substance prevents the cover from moving in a second, opposite direction. The treatment substance forms a support for the cover. In this manner, the treatment substance can form a stop for the cover. The cover can be arranged with some clearance between the latching means and treatment substance.

Furthermore, it is advantageous, if the side wall extends substantially in parallel with a container longitudinal axis. A slight demoulding chamfer provided for easier demoulding of the injection-moulded part is not to be excluded thereby.

According to one advantageous embodiment, the container has a closure for closing the opening.

The injection-moulded part can be manufactured preferably from a synthetic material selected from the following group: PP (polypropylene), HDPE (high density polyethylene), PET (polyethylene terephthalate), PC (polycarbonate), COC (cyclo-olefin-copolymer).

Furthermore, it has proved to be successful, if the injection-moulded part is produced from a synthetic material having a flexural modulus of elasticity between 500 MPa and 3500 MPa, preferably between 1000 MPa and 3000 MPa. The modulus of elasticity can be determined according to DIN 53457 in the version valid as of 1 Dec. 2014.

The method for producing a container in accordance with the inventions, includes the steps of:
injection-moulding a container body in an injection mould, wherein the injection mould is formed such that the container body has a side wall, a container base connected to the side wall, an opening, a chamber for a treatment substance and a latching means for a cover of the chamber, said latching means being arranged on the inner side of the side wall;
demoulding the container body from the injection mould;
filling the treatment substance into the chamber using a filling device;
inserting a cover of the chamber through the opening, wherein the cover latches behind the latching means and prevents the solid treatment substance from leaving the chamber.

In this way, it is possible in a reliable and cost-effective manner to produce a container body, in which the side wall is integrally connected to the container body. Processing steps, such as in particular machining of the container body, are not required. In particular, the method is suitable for producing the container in accordance with the invention.

In accordance with the invention, it is preferred that during injection-moulding, a portion of the injection mould delimits the inner side of the side wall and the latching means.

Furthermore, in accordance with the invention, it is preferred that the demoulding is performed as forced demoulding, wherein a part of the injection mould is moved across the latching means with the side wall being deformed. This contributes to cost-effective production.

Further objectives, features, advantages and possible applications of the present invention will be apparent from the description hereinafter of exemplified embodiments with reference to the drawing. All of the described and/or figuratively illustrated features form the subject matter of the invention in their own right or in any meaningful combination, even irrespective of the combination in individual claims or dependency references thereof.

BRIEF DESCRIPTION OF THE DRAWINGS

FIGS. 2a-2b: show the filling of the chamber of the container of FIG. 1a;

FIGS. 2c-2d: show the insertion of the cover into the container of FIG. 2a.

DETAILED DESCRIPTION

Figure 1A:
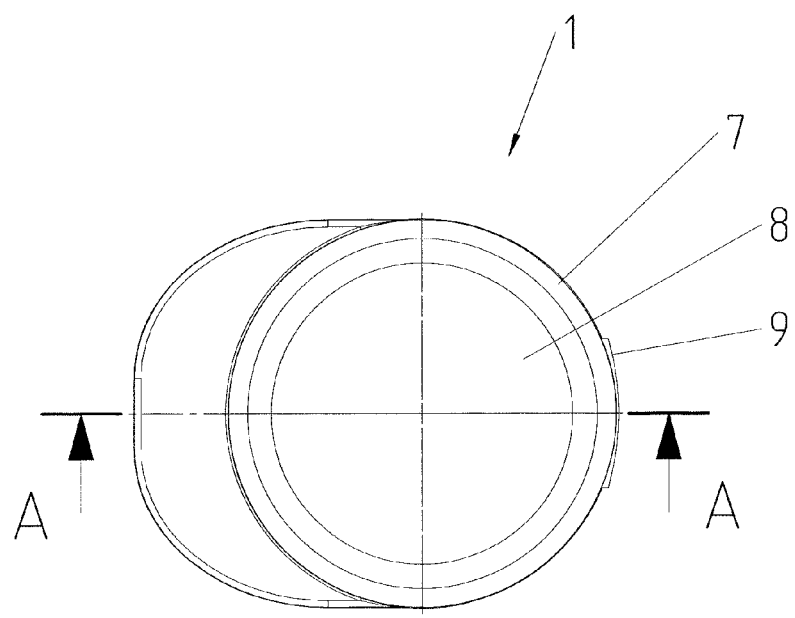
FIG. 1a: shows a top view of a container in accordance with the invention.

In reference to the figures a container 1 comprises a container body 2, which forms a receiving space 3. The container body 2 has a side wall 4 and a container base 5, which is integrally connected to the side wall 4.

Figure 1B:
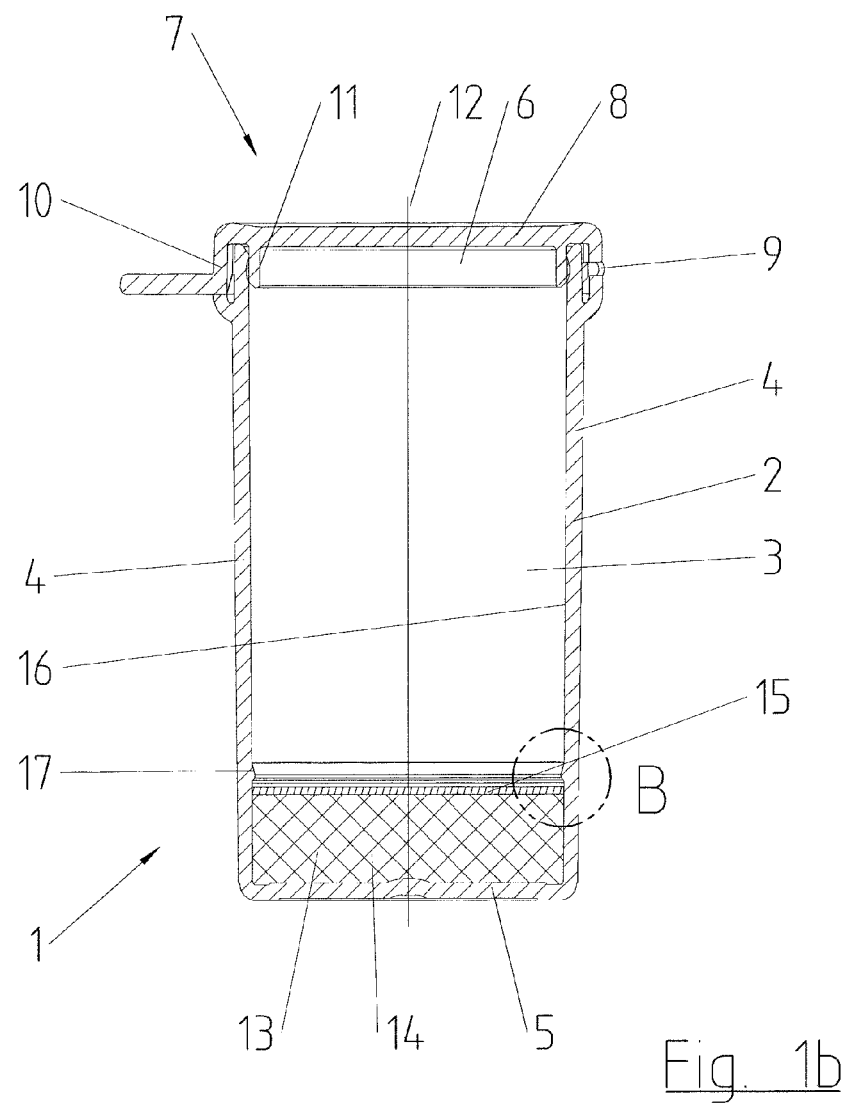
FIG. 1b: shows a cross section through the container of FIG. 1a along line A-A.

The container body 2 has an opening 6. In the illustrated exemplified embodiment, this opening 6 is arranged on the side of the container body 2 opposite the container base 5. The container 1 also has a closure 7 for closing the opening 6. In the illustrated exemplified embodiment, the closure 7 is formed as a lid 8. This lid 8 is movably arranged on the container body 2. For this purpose, a hinge 9 is provided, via which the lid 8 is movably arranged on the container body 2. The hinge 9 can be formed as a film hinge or as a butterfly hinge. The lid 8 and the container body 2 are formed as a continuous injection-moulded part. The lid 8 can assume an open position or a closed position. The closed position is illustrated in FIGS. 1a and 1b, whereas the open position is illustrated in FIGS. 2a to 2d. The lid 8 has a skirt 10. Furthermore, the lid 8 has a sealing portion 11. This sealing portion is formed as an annular element, which lies with its outer side against the inner side of the side wall 4. In addition to the opening 6, the container body 2 does not have any further openings. The opening 6 forms a removal opening, through which the goods to be packaged can be removed from the receiving space 3.

In the illustrated exemplified embodiment, the container body 2 is formed in a cylindrical manner. The side wall 4 extends substantially in parallel with a longitudinal axis 12 of the container body 2.

Furthermore, the container body 2 has a chamber 13, which is filled with a treatment substance 14. In the figures, the treatment substance 14 is indicated only schematically by the cross-hatching. The treatment substance 14 has a solid consistency and can be arranged in particular as filling in the chamber 13. In particular, the treatment substance 14 can be in powder form and/or can have granular particles. In accordance with the invention, it is preferred if the treatment substance 14 is a drying agent, such as e.g. silica gel.

The chamber 13 is provided with a cover 15. This prevents the solid treatment substance 14 from leaving the chamber 13. However, the cover 15 is, to a certain extent, moisture-permeable and gas-permeable and therefore enables e.g. moisture to pass from the receiving space 3 through the cover 15 to the treatment substance 14 and to be bonded thereby. The cover 15 can comprise e.g. cardboard, a non-woven material (e.g. Tyvek), a mesh structure, a perforated synthetic material disk and/or a woven fabric. In the present case, the use of cardboard, a synthetic material mesh structure and/or a perforated synthetic material disk is particularly suitable owing to the elastic properties.

Goods to be packaged, which are not illustrated, can be arranged in the receiving space 3. The goods to be packaged can be in particular a pharmaceutical product, such as a medicament. Furthermore, the container 1 is particularly suitable for chemical substances and substances for analysis, in particular also in the form of test strips.

The container body 2 is formed as a synthetic material injection-moulded part. Furthermore, in the illustrated exemplified embodiment, the injection-moulded part comprises the lid 8, which is connected to the container body 2 via the hinge 9. The container base 5 and the side wall 4 are integrally connected to one another. A latching means 17 is arranged on the inner side 16 of the side wall 4. In the illustrated exemplified embodiment, the latching means 17 has a protrusion. This produces an undercut. In the illustrated exemplified embodiment, the protrusion of the latching means is formed in an annularly circumferential manner. The cover 15, which, as will be explained in detail hereinafter, is inserted through the opening 6, is latched behind the latching means 17. This can be seen particularly clearly in FIGS. 1b and 1c.

Figure 1C:
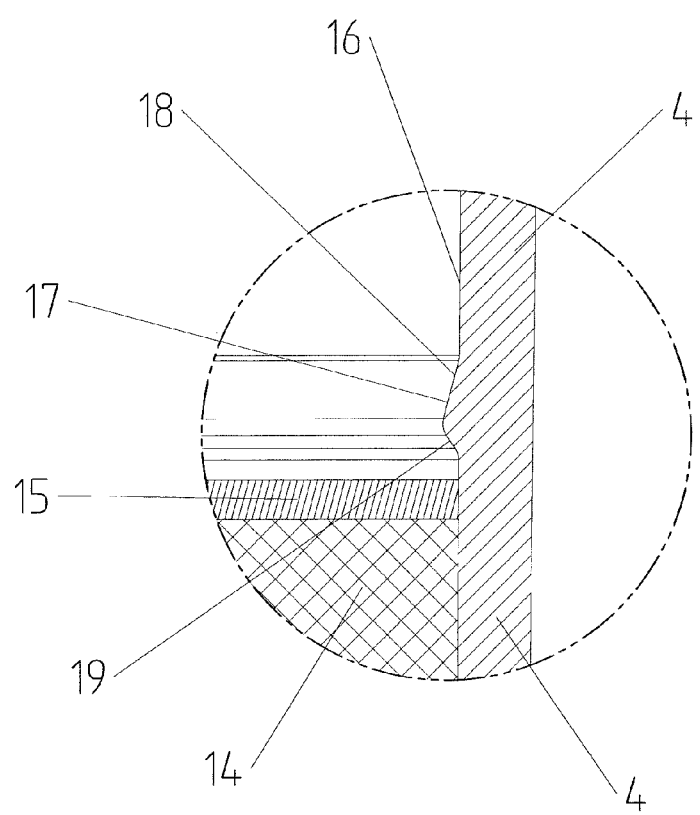
FIG. 1c: shows the enlarged detail B of FIG. 1b.

It can also be seen clearly in FIG. 1c how the latching means 17 protrudes with respect to the inner side 16 of the side wall 4. It has proven to be advantageous, if the latching means 17 protrudes with respect to the inner side 16 of the side wall 4 by a value between 0.1 mm and 1.0 mm, particularly preferably between 0.15 mm and 0.5 mm. Accordingly, in the case of the illustrated embodiment, the inner width of the container body 2 in the region of the latching means is 0.2 mm to 2.0 mm, particularly preferably between 0.3 mm and 1.0 mm, smaller than in the region of the side wall 4 outside the latching means 17.

It can also be seen in FIG. 1c that the latching means 17 has, on its side facing towards the opening 6, a first sliding surface 18, which is inclined with respect to the longitudinal axis 12 of the container body 2. When the cover 15 is inserted through the opening 6, the cover 15 can slide along the first sliding surface 18 before it latches in behind the latching means 17.

On the side facing away from the opening 6, the latching means 17 has a second sliding surface 19, which is inclined with respect to the longitudinal axis 12 of the container body 2. This facilitates in particular demoulding after injection-moulding.

It can also be clearly seen in FIGS. 1b and 1c that the cover 15 is arranged on a side of the latching means 17 facing towards the chamber 13. The cover 15 lies against the side wall 4 in a region of the side wall 4 adjacent to the latching means 17.

It can also be seen in FIG. 1c that the maximum volume of the chamber 13, which is determined by the position of the latching means 17 and the highest position of the cover 15 resulting therefrom, is slightly greater than the volume of the treatment substance 14 received therein. This can be clearly seen in FIG. 1c as the cover 15, which lies on the treatment substance 14, is arranged slightly below the latching means 17. Some clearance thus remains for the cover 15. This helps to ensure that the cover 15 can be latched-in more easily. Furthermore, filling level differences can be compensated for. Furthermore, the side wall 4 does not have a protrusion on the side of the cover 15 facing towards the chamber 13. Accordingly, the cover 15 is held between the treatment substance 14 and the latching means 17.

The cover 15 is elastically deformable so that, when the cover 15 is being inserted, it can be moved past the latching means 17 with the cover being elastically deformed.

During the production of the container 1, the container body 2 is produced in an injection mould. The injection mould is formed such that the container body 2 comprises the side wall 4, the container base 5 connected to the side wall 4, the opening 6, the chamber 13 and the latching means 17 arranged on the inner side 16 of the side wall 4. In the illustrated exemplified embodiment, the closure 7 comprising the hinge 9 is produced in one piece with the container body 2. Therefore, the injection mould is formed such that these elements can be produced together in the same injection-moulding operation.

After the injection-moulding, the container body 2 is demoulded from the injection mould. Demoulding is performed as forced demoulding, in which a part of the injection mould is moved via the latching means 17 with the side wall being deformed 4. This is then followed by the introduction of the treatment substance 14 into the chamber 13 and the insertion of the cover 15. This is illustrated in detail in FIGS. 2a to 2d.

Figure 2A:
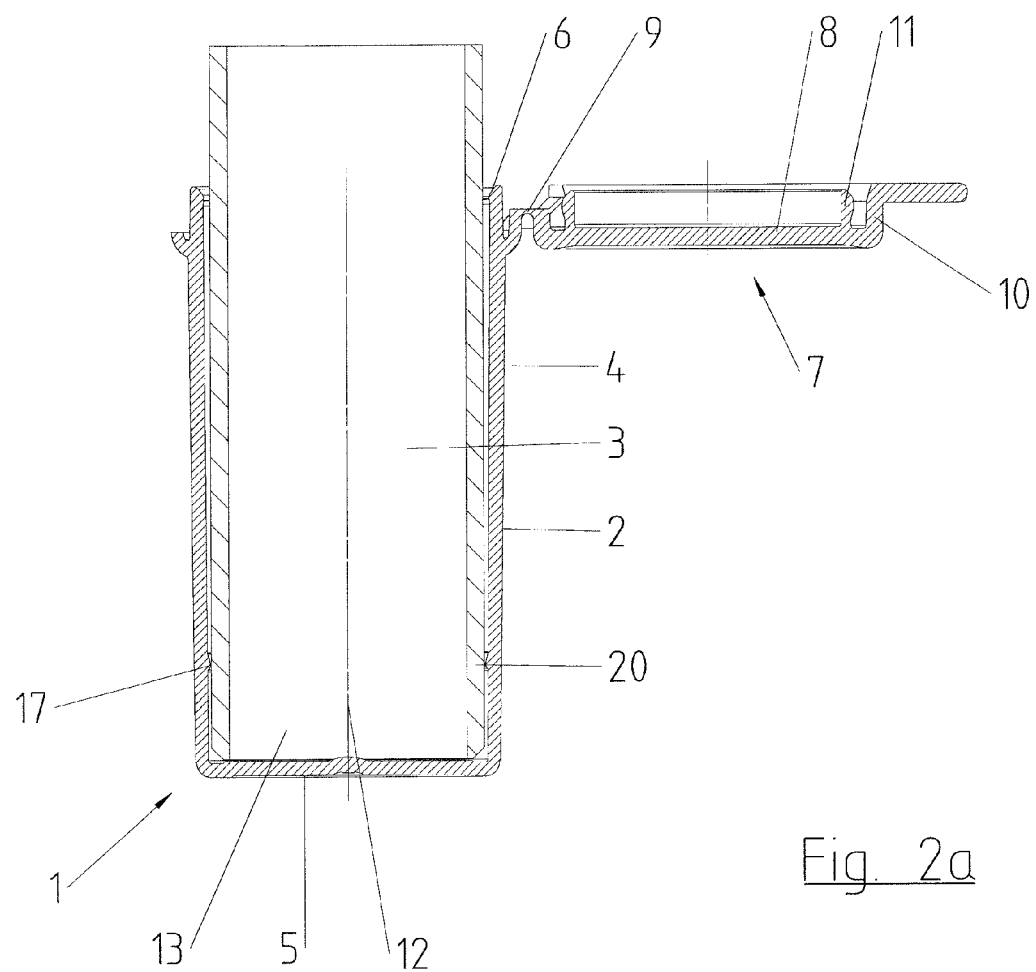
Figure 2B:
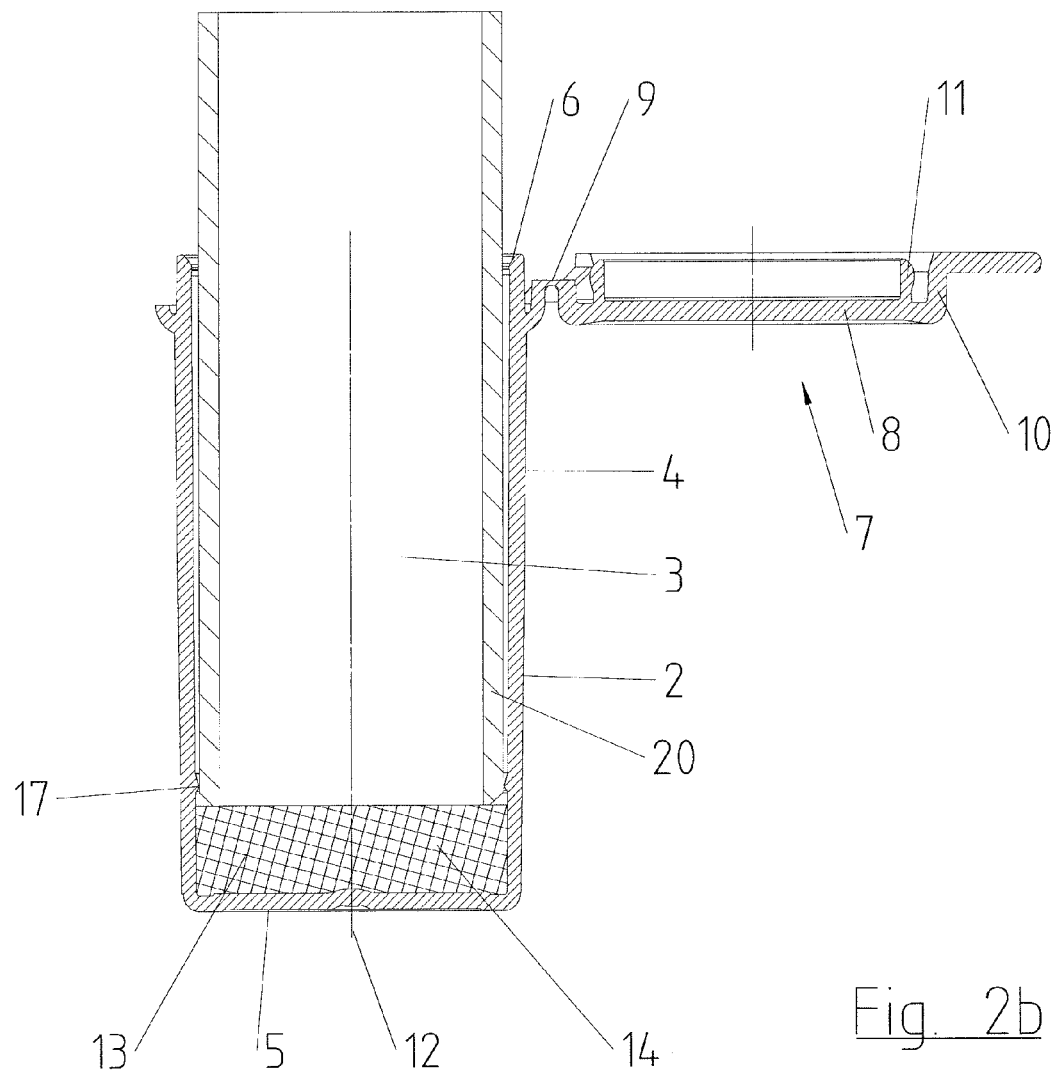

FIG. 2a illustrates the container body 2 comprising the closure 7 after demoulding. Further, a filling device 20 is shown, which comprises a filling mandrel, which is inserted into the container body 2 as far as the lowermost region of the chamber 13. The filling device 20 lies almost against the container base 5. The procedure of introducing the treatment substance 14 begins in the position illustrated in FIG. 2a. During the filling, the filling device 20 is moved slowly towards the opening 6. The procedure of introducing the treatment substance 14 is terminated when the desired quantity of treatment substance 14 has been introduced into the chamber 13. This is illustrated in FIG. 2b. Since the volume of the treatment substance 14 is slightly less than the maximum volume of the chamber 13, which is defined by the position of the latching means 17, the upper rim of the treatment substance 14 is located below the latching means 17.

Figure 2C:
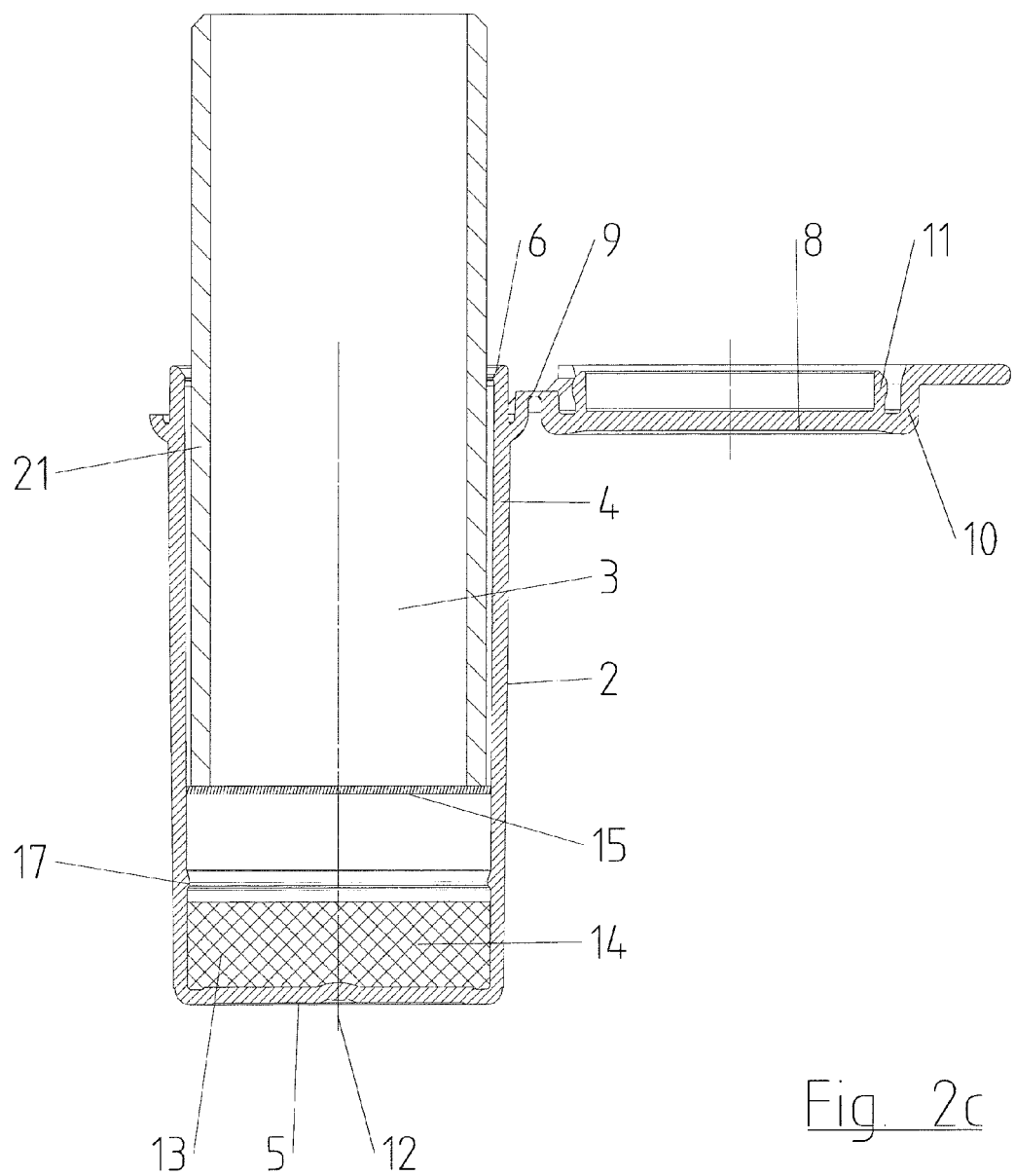
Figure 2D:
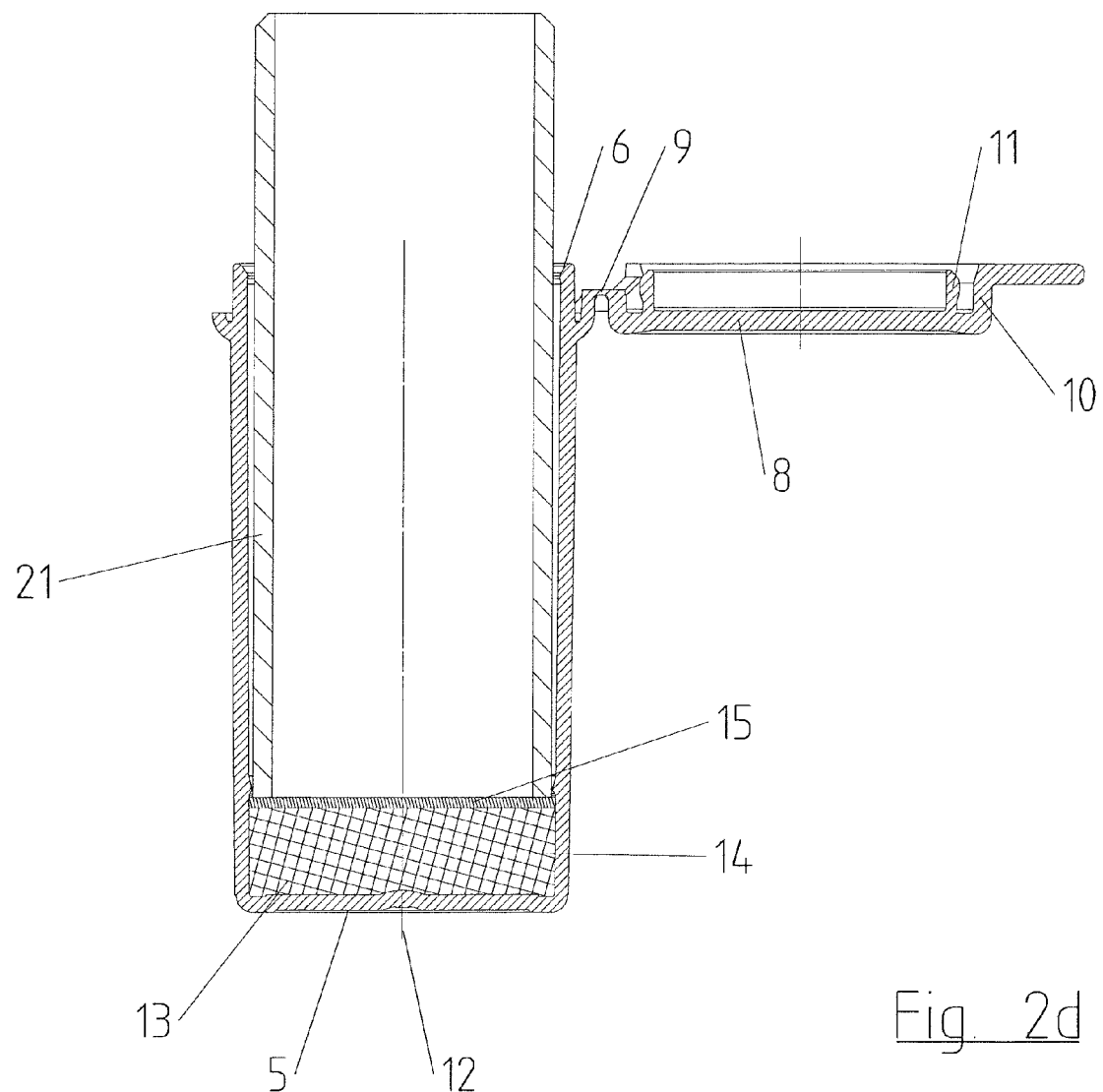

The filling device 20 is then completely withdrawn from the container body 2. Subsequently, the cover 15 is inserted with a feeding device 21 through the opening 6. This is illustrated in FIG. 2c. This figure clearly shows the feeding device 21, which is inserted a certain distance into the container body 2, with the cover 15. The feeding device 21 is then moved towards the container base 5 until the cover 15 latches in behind the latching means 17 and comes to lie on the treatment substance 14. Subsequently, the feeding device 21 is drawn out of the container body 2. The receiving space 3 can then be filled with goods to be packaged.

The invention claimed is:

1. A container comprising: a container body, which forms a receiving space for goods to be packaged, wherein the container body comprises a side wall and a container base integrally connected to the side wall, wherein the container body has an opening, wherein the container body has a chamber, which is filled with a solid treatment substance, wherein the chamber is provided with a cover, which prevents the solid treatment substance from leaving the chamber and is at least one of moisture-permeable and gas-permeable, wherein the container body has a synthetic material injection-moulded part, which forms the container base and the side wall integrally connected to the container base, wherein arranged on an inner side of the side wall is a latching member, behind which the cover is latched-in, wherein the latching member has on its side facing towards the opening a first sliding surface inclined to a longitudinal axis of the container body which is inclined at an angle of inclination of less than 20° with respect to the longitudinal axis, the latching member and the cover being formed in such a way, that the cover slides along the first sliding surface during insertion, deforming the cover, before it latches in behind the latching member, and has on its side facing away from the opening a second sliding surface which is inclined with respect to the longitudinal axis of the container body and which is inclined at an angle of inclination of less than 45° with respect to the longitudinal axis of the container body.

2. The container according to claim 1 wherein the latching member protrudes with respect to the inner side of the side wall by a value between 0.1 mm and 1.0 mm.

3. The container of claim 1 wherein the cover is arranged on a side of the latching member facing towards the chamber.

4. The container of claim 1 wherein the cover lies against the side wall in a region of the side wall adjacent to the latching member.

5. The container of claim 1 wherein the maximum volume of the chamber, which is determined by the position of the latching member and the position of the cover resulting therefrom, is slightly greater than the volume of the treatment substance received therein.

6. The container of claim 1 wherein the side of the cover facing towards the chamber and the side wall does not have a protrusion for fixating the cover.

7. The container of claim 1 wherein the cover is elastically deformable such that, during insertion of the cover, the cover can be moved past the latching member.

8. A method of producing a container, comprising the steps of:

injection-moulding a container body in an injection mould, wherein the injection mould is formed such that the container body has a side wall, a container base connected to the side wall, an opening, a chamber for a treatment substance and a latching member for fixating a cover of the chamber, said latching member being arranged on the inner side of the side wall and extending circumferentially around the side wall wherein the latching member has on its side facing towards the opening a first sliding surface inclined to a longitudinal axis of the container body which is inclined at an angle of inclination of less than 20° with respect to the longitudinal axis, and a second sliding surface which is inclined with respect to the longitudinal axis of the container body and which is inclined at an angle of inclination of less than 45°;

demoulding the container body from the injection mould;

introducing the treatment substance into the chamber using a filling device; and inserting a cover of the chamber through the opening, wherein the cover latches in behind the latching member and prevents the solid treatment substance from coming out of the chamber.

9. The method according to claim 8, wherein during injection-moulding, a portion of the injection mould defines the inner side of the side wall and the latching member.

10. The method according to claim 8 wherein the demoulding is performed as forced demoulding, wherein a part of the injection mould is moved across the latching member with the side wall being deformed.

11. A container comprising:

a container body which forms a receiving space for goods to be packaged, wherein the receiving space comprises an opening, an inner side wall, a base integrally connected to the inner side wall, and a chamber proximate the base which is filled with a solid treatment substance, wherein the chamber is provided with a cover, which prevents the solid treatment substance from leaving the chamber and is at least one of moisture-permeable and gas-permeable, wherein the container body has a synthetic material injection-moulded part, which forms the base and the inner side wall, wherein the inner side wall has a latching protrusion forming at least a partial ring extending annularly and circumferentially around the inner side wall, wherein the latching protrusion has on its side facing towards the opening a first sliding surface inclined to a longitudinal axis of the container body which is inclined at an angle of inclination of less than 20° with respect to the longitudinal axis, the latching protrusion and the cover being formed in such a way, that the cover slides along the first sliding surface during insertion, deforming the cover, before it latches in behind the latching member, and has on its side facing away from the opening a second sliding surface which is inclined with respect to the longitudinal axis of the container body and which is inclined at an angle of inclination of less than 45° with respect to the longitudinal axis of the container body, wherein the cover is fixated from movement against the latching protrusion.

12. The container of claim 11 wherein the latching protrusion protrudes inward with respect to the inner side wall by a value between 0.1 mm and 1.0 mm.

13. The container of claim 11 wherein on the side of the cover facing towards the chamber does not have a protrusion for fixating the cover against the latching protrusion.

14. The container of claim 11 wherein the cover is elastically deformable such that, during insertion of the cover, the cover can be moved into position against and fixated relative to the latching protrusion.

15. The container of claim 11 wherein the container body is injected-moulded such that the solid treatment substance is insertable into the chamber using a filling device and the cover is deformable and adapted to be inserted in position after insertion of the solid treatment substance and locked in place against the latching protrusion thereby preventing the solid treatment substance from coming out of the chamber.

* * * * *